United States Patent
Fink et al.

(10) Patent No.: US 9,300,638 B2
(45) Date of Patent: Mar. 29, 2016

(54) METHOD AND APPARATUS FOR PROVIDING ADAPTIVE SELF-SYNCHRONIZED DYNAMIC ADDRESS TRANSLATION AS AN INTRUSION DETECTION SENSOR

(71) Applicants: BBNT Solutions LLC, Cambridge, MA (US); Verizon Corporate Services Group Inc., New York, NY (US)

(72) Inventors: Russell Andrew Fink, Laurel, MD (US); Matthew Aloysius Brannigan, Las Cruces, NM (US); Shelby Alana Evans, Woodstock, MD (US); Aswin Morgan Almeida, Columbia, MD (US)

(73) Assignees: Verizon Patent and Licensing Inc., Basking Ridge, NJ (US); Raytheon BBN Technologies Corp., Cambridge, MA (US)

( * ) Notice: Subject to any disclaimer, the term of this patent is extended or adjusted under 35 U.S.C. 154(b) by 498 days.

(21) Appl. No.: 13/911,584

(22) Filed: Jun. 6, 2013

(65) Prior Publication Data
US 2013/0275751 A1  Oct. 17, 2013

Related U.S. Application Data

(60) Division of application No. 13/240,752, filed on Sep. 22, 2011, now Pat. No. 8,650,643, which is a continuation of application No. 09/928,133, filed on Aug. 10, 2001, now Pat. No. 8,037,530.

(60) Provisional application No. 60/228,900, filed on Aug. 28, 2000.

(51) Int. Cl.
*H04L 29/06* (2006.01)
*H04L 9/08* (2006.01)
*H04L 29/12* (2006.01)

(52) U.S. Cl.
CPC .......... *H04L 63/0428* (2013.01); *H04L 9/0841* (2013.01); *H04L 29/12433* (2013.01);
(Continued)

(58) Field of Classification Search
CPC . H04L 9/0841; H04L 63/0428; H04L 63/068; H04L 63/1416; H04L 61/103; H04L 61/259; H04L 61/6059; H04L 61/2015; H04L 29/12028; H04L 29/12433
See application file for complete search history.

(56) References Cited

U.S. PATENT DOCUMENTS 5,320,493 A   6/1994  Shih et al.
5,513,337 A * 4/1996  Gillespie ............. G06F 12/1441
                                                            711/152
(Continued)

FOREIGN PATENT DOCUMENTS

EP          0702477       3/1996
WO      WO-97/26734      7/1997

OTHER PUBLICATIONS

Dunlop et al, "The Blind Man's Bluff Approach to Security Using IPv6", Jul./Aug. 2012, IEEE Computer and Reliabilty Sessions, pp. 35-43.*

(Continued)

*Primary Examiner* — Tamara T Kyle

(57) ABSTRACT

A translator is provided for translating predetermined portions of packet header information including an address of a data packet according to a cipher algorithm keyed by a cipher key derived by a key exchanger. A mapping device is also provided for mapping the address to a host table stored in memory. If the address does not match an entry in the host table, a security device is triggered.

20 Claims, 10 Drawing Sheets

(52) U.S. Cl.
CPC ........ *H04L61/2015* (2013.01); *H04L 61/2539* (2013.01); *H04L 61/6059* (2013.01); *H04L 63/068* (2013.01); *H04L 29/12028* (2013.01); *H04L 61/103* (2013.01); *H04L 63/1416* (2013.01)

(56) References Cited

U.S. PATENT DOCUMENTS

| | | | |
|---|---|---|---|
| 5,548,646 | A | 8/1996 | Aziz et al. |
| 5,757,924 | A | 5/1998 | Friedman et al. |
| 5,798,706 | A | 8/1998 | Kraemer et al. |
| 5,802,320 | A | 9/1998 | Baehr et al. |
| 6,055,236 | A | 4/2000 | Nessett et al. |
| 6,092,196 | A | 7/2000 | Reiche |
| 6,119,171 | A | 9/2000 | Alkhatib |
| 6,154,839 | A | 11/2000 | Arrow et al. |
| 6,256,715 | B1 | 7/2001 | Hansen |
| 6,304,973 | B1 | 10/2001 | Williams |
| 6,330,562 | B1 | 12/2001 | Boden et al. |
| 6,363,614 | B1 | 4/2002 | Umstead et al. |
| 6,507,908 | B1 | 1/2003 | Caronni |
| 6,510,154 | B1 * | 1/2003 | Mayes .................. H01R 31/005 370/389 |
| 6,535,511 | B1 | 3/2003 | Rao |
| 6,650,621 | B1 | 11/2003 | Maki-Kullas |
| 6,701,432 | B1 | 3/2004 | Deng et al. |
| 7,010,608 | B2 * | 3/2006 | Garg .................. H04L 29/12009 709/225 |
| 7,089,428 | B2 * | 8/2006 | Farley .................. G06F 21/552 726/22 |
| 7,508,799 | B2 * | 3/2009 | Sumner ............... H04L 63/0428 370/338 |
| 8,205,259 | B2 * | 6/2012 | Stute .................. C12Q 1/6804 726/23 |
| 8,209,381 | B2 * | 6/2012 | Sinn ...................... H04L 12/585 706/12 |
| 8,214,653 | B1 * | 7/2012 | Marr .................... G06F 21/572 380/286 |
| 8,639,928 | B2 * | 1/2014 | Bursell ............... G06F 21/6218 380/270 |
| 9,106,624 | B2 * | 8/2015 | Hudson, Jr. ......... H04L 63/0457 |
| 2002/0010799 | A1 | 1/2002 | Kubota et al. |
| 2002/0122394 | A1 | 9/2002 | Whitmore et al. |
| 2002/0184390 | A1 | 12/2002 | Alkhatib |
| 2003/0130909 | A1 | 7/2003 | Caci et al. |

OTHER PUBLICATIONS

Phatak et al, "Spread Identity: A New Dynamic Address Remapping Mechanism for Anonymity and DDoS Defense", Jan. 2011, University of Maryland.*

"Ex-KGB Expert Unveils New Computer Shield," Reuters Limited, http://news.hitb.org/content/ex-kgb-expert-unveils-new-computer-shield, four pages, May 21, 2001.

"Multiple-Entry Key Look-Aside Table for Bulk Cryptographic Functions," IBM Technical Disclosure Bulletin, vol. 36, Issue 11, pp. 437-442, Nov. 1, 1993.

Kohl, et al., "The Kerberos Network Authentication Service," MIT Project Athena, Network Working Group, Internet-Draft, 66 pages, Jun. 30, 1991.

* cited by examiner

METHOD AND APPARATUS FOR PROVIDING ADAPTIVE SELF-SYNCHRONIZED DYNAMIC ADDRESS TRANSLATION AS AN INTRUSION DETECTION SENSOR

CROSS REFERENCE TO RELATED APPLICATIONS

This application is a divisional Ser. No. 13/240,752, filed Sep. 22, 2011, which is a continuation of U.S. patent application Ser. No. 09/928,133, filed on Aug. 10, 2001, now issued as U.S. Pat. No. 8,037,530, which claims priority under 35 U.S.C. §119(e) to U.S. Provisional Patent Application No. 60/228,900, filed Aug. 28, 2000 each of which is hereby incorporated by reference in its entirety. The instant application is related to U.S. patent application Ser. No. 09/927,671, now issued as U.S. Pat. No. 7,043,633, which claims the benefit of U.S. Provisional Application No. 60/228,832, filed Aug. 28, 2000; and U.S. patent application Ser. No. 09/927,979, now issued as U.S. Pat. No. 6,826,684, each filed on even date herewith, each having assignee in common with that of the instant patent application, and each being incorporated herein by reference in its entirety.

BACKGROUND OF THE INVENTION

This invention relates generally to the field of network communication systems and, more particularly to intrusion detection sensors for use with network communication systems.

RELATED ART

A set of inter-connected computer networks that spans a relatively large geographical area is called a wide area network (WAN). Typically, a WAN consists of two or more local-area networks (LANs). Computers connected to a WAN are often connected through public networks, such as the telephone system. They can also be connected through leased lines or satellites. The largest WAN in existence is the Internet.

The Internet is a public, world-wide WAN defined by the IP (Internet Protocol) suite of protocols, which has in recent years gone from being a tool used primarily in scientific and military fields to become an important part of the missions of a wide variety of organizations. Organizations often run one or more LANs and connect their LANs to the Internet to share information with the cyber world in general, and with other organization-run LANS that may be remotely located. However, along with providing new levels of connectivity and sources of information, connection to the Internet or to a private WAN has brought security risks in the form of adversaries seeking to disrupt or infiltrate the organization's mission by interfering with or monitoring the organizations' networks.

Several security devices that exist today are designed to keep external adversaries from obtaining access to a LAN. Firewalls, for example, protect the LAN against unauthorized access by allowing only communications data (commonly called datagrams or "packets") from known machines to pass. This is accomplished by monitoring network IP addresses on these packets, which correspond uniquely to a particular machine, and TCP service ports, which usually map into a specific type of software application such as mail, ftp, http and the like. The firewall then determines whether to allow or disallow entry of the packet into the LAN as it deems appropriate.

Virtual Private Network (VPN) and other Internet Protocol Security (IPsec) devices protect against unauthorized interception of transmitted data by encrypting the entire packet. For example, a VPN (in tunnel mode) wraps outgoing datagrams with its own header and sends the encrypted packet to a destination VPN. A limitation of VPNs, however, is that adversaries can determine where the VPN devices are located in the network, since each VPN has a specific IP address. Accordingly, a VPN does not hide its location in the network, and is therefore vulnerable to an attack once its location is known. Similarly, other security technology, such as configured routers, Secure Socket Layer (SSL) and host-based Internet Protocol Security (IPsec) fail to obscure the location of nodes inside a network.

Although prior art techniques are generally good for their intended purposes, they do not address the problem of detecting intrusion attempts against the network. To alert against possible intrusion attempts, network administrators have turned to intrusion detection sensing (IDS) technology. IDS technology is used to ascertain the level of adversary activity on the LAN and to monitor the effectiveness of other security devices, such as those discussed above. IDS products work by looking for patterns of known attack, including network probes, specific sequences of packets representing attacks (called known intrusion patterns, or KIPs), and the like. An administrator uses IDS technology primarily to determine the occurrence of any adversarial activity, information useful in evaluating the effectiveness of current security technology and justifying additional commitment to network security.

In addition to protecting transmitted data, an organization may wish to prevent unauthorized parties from knowing the topology of their LANs. Existing security techniques do not completely secure a network from adversaries who employ traffic mapping analysis. Data packets exchanged across networks carry not only critical application data, but also contain information that can be used to identify machines involved in the transactions.

Today's sophisticated adversaries employ network-level "sniffers" to passively monitor freely transmitted network traffic and thereby gather critical network topology information, including the identities of machines sending and receiving data and the intermediate security devices that forward the data. The sophisticated adversary can use this identity information to map internal network topologies and identify critical elements such as: roles of the servers, clients and security devices on the network, classes of data associated with specific servers, and relative mission importance of specific machines based on network traffic load. The adversary can then use this network map information to plan a well-structured, network-based attack.

Recently, a network security technique has been developed that addresses this problem by concealing the identities of machines and topology in the LAN. The technology was developed by the assignee of the present application, and is described in U.S. patent application Ser. No. 09/594,100, entitled Method and Apparatus for Dynamic Mapping and hereby incorporated by reference. The Dynamic Mapping technique hides machine identities on IP data packets by translating source and destination addresses just prior to transmitting them over the Internet. When packets arrive at an authorized destination, a receiving device programmed with the Dynamic Mapping technique restores the source and destination addresses (according to a negotiated scheme) and forwards the packets to the appropriate host on its LAN.

While the Dynamic Mapping technique represents a significant advancement in the field of network security, a fundamental limitation of the technique is that it is a time-based, fixed-key system, i.e., all packets matching a given destination address are consistently translated, or mapped, to a fixed "other" destination address for a given interval of time. When that time interval expires, the mapping is changed to something else. Thus, the time-based nature of the technique requires strict synchronization between endpoints, and can make operations difficult.

Besides the operational difficulties with a time-based system, the length of each translation time interval is sufficient for an adversary to extrapolate information from observed communications, even though observed addresses are false. Furthermore, adversaries are able to enact active attacks by sending forged packets to the false addresses knowing that they will reach their true destination. A further limitation is that the Dynamic Mapping technique was designed as a fixed-association security system, requiring fixed keys to be established between the client and server. This effectively binds clients to a specific server, limiting the flexibility of the system and preventing autonomous negotiations with other servers.

There exists, therefore, a great need for a method of concealing the identities of LAN machines and topology that takes an entirely fresh approach, departs from the time-dependant systems of the past, and provides a security technique that is more robust and more difficult to defeat. The technique should ideally allow for construction of network access devices, such as routers, that offer the benefits of Dynamic Mapping to protect an enclave of computers. In addition, these devices should be flexible enough to be self-discovering, able to negotiate mapping parameters with one another on a need-based, authorized basis.

While as a general matter the need exists to confuse adversaries and dissuade them from attempting to uncover network topology, there is also a need for a technique that will detect a potential adversary who makes such an attempt. This may be advantageous since it would enable the network to identify which adversaries are interested in learning about the network.

SUMMARY OF THE INVENTION

Accordingly, it is an object of this invention to drive up risk of detection of associations that analyze and attack network traffic.

In accordance with the teachings of the present invention, these and other objects may be accomplished by the present invention, which is a Adaptive Self-Synchronized Dynamic Address Translation as an Intrusion Detection Sensor method and apparatus for detecting adversarial activity on a network including a memory adapted to store a host table and a key exchanger adapted to derive a cipher key. The apparatus further includes a translator adapted to translate predetermined portions of packet header information of a data packet according to a cipher algorithm keyed by the cipher key, where the predetermined portions include an address. The apparatus further includes a mapping device adapted to map the address to the host table and an actuator adapted to trigger a security device when the address does not match an entry in the host table.

Another embodiment of the present invention is a method for detecting adversarial activity on a network, including storing a host table and deriving a cipher key, translating predetermined portions of packet header information of a data packet according to a cipher algorithm keyed by the cipher key, where the predetermined portions include an address. The method further includes mapping the address to the host table and triggering a security device when the address does not match an entry in the host table.

Yet another embodiment of the present invention is a device for detecting adversarial activity on a network including means for storing a host table, and means for deriving a cipher key. The device further includes means for translating predetermined portions of packet header information of a data packet according to a cipher algorithm keyed by the cipher key, where the predetermined portions include an address. The device further includes means for mapping the address to the host table and means for triggering a security device when the address does not match an entry in the host table.

Another embodiment of the present invention is a bastion host adapted for processing packet header information of a data packet, the bastion host being operable to store a host table and derive a cipher key. The bastion host is further operable to translate predetermined portions of packet header information of a data packet according to a cipher algorithm keyed by the cipher key, where the predetermined portions include an address. The bastion host is further operable to map the address to the host table and trigger a security device when the address does not match an entry in the host table.

The invention will next be described in connection with certain exemplary embodiments; however, it should be clear to those skilled in the art that various modifications, additions and subtractions can be made without departing from the spirit or scope of the claims.

BRIEF DESCRIPTION OF THE DRAWINGS

The invention will be more clearly understood by reference to the following detailed description of exemplary embodiments in conjunction with the accompanying drawings, in which.

DETAILED DESCRIPTION OF THE INVENTION

As mentioned above, the Dynamic Mapping technique of concealing the identities of machines and topology in the LAN is time-dependant and requires synchronization between communication partners. In addition, that technique requires a mapping of false addresses to true addresses.

Applicants have invented a systematic method of making this technique even more robust. In particular, Applicants have invented a method of translating source and destination addresses and packet identifier information on a per-packet basis that extends the Dynamic Mapping technique by eliminating its time-dependency, synchronization, and mapping requirements. This new concept, which may be referred to for the sake of convenience as Adaptive Self-Synchronized Dynamic Address Translation (ASD), continually remaps machine source and destination addresses and packet identifier information, thereby continually changing the network appearance to adversaries outside an ASD-protected enclave.

Figure 1:
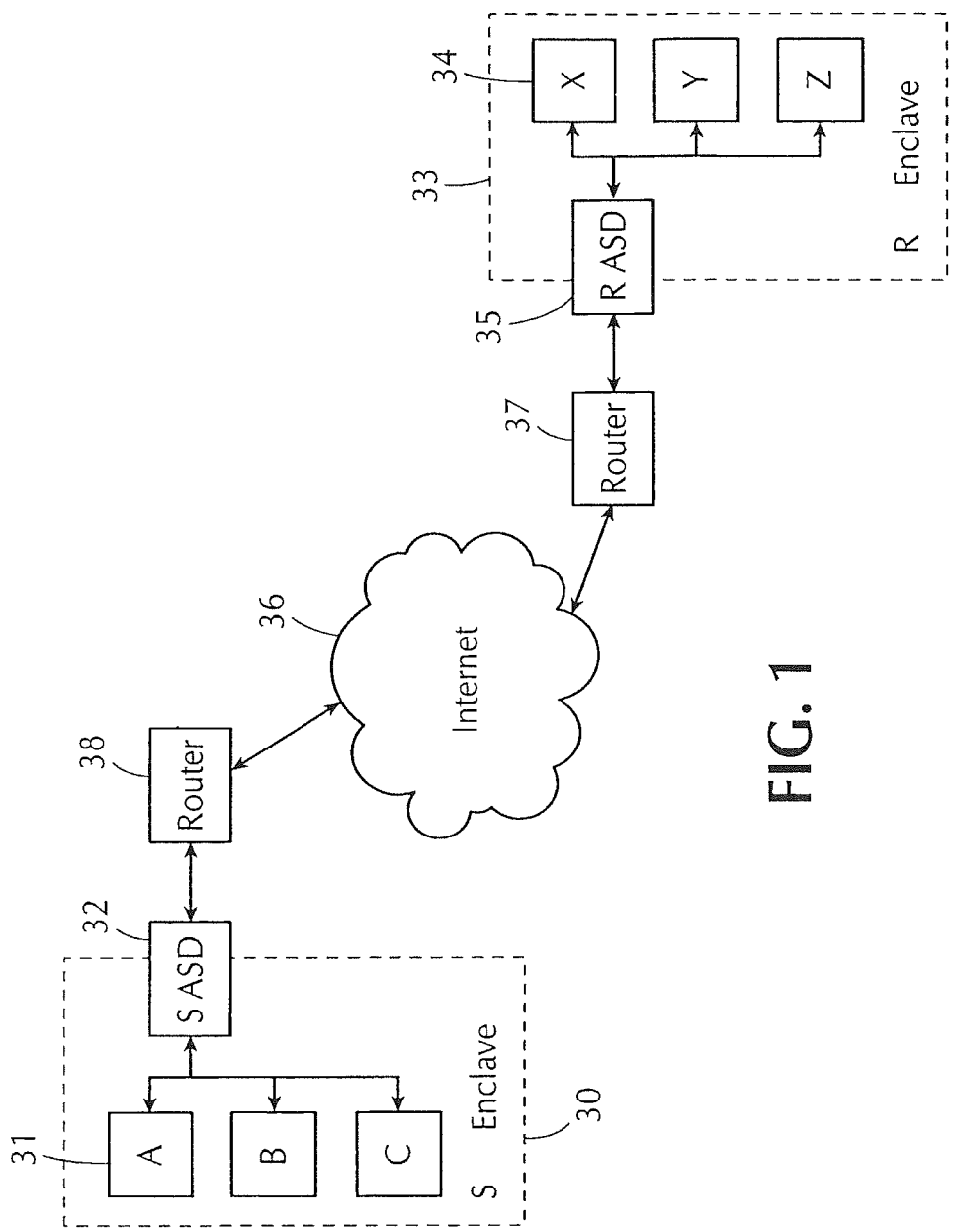
FIG. 1 is a block diagram of a network implementing Adaptive Self-Synchronized Dynamic Address Translation in accordance with an embodiment of the present invention.

A preferred embodiment of the ASD technique of the present invention will now be described with reference to FIGS. 1 and 2. FIG. 1 is a block diagram of a network implementing the ASD technique of the present invention to protect enclaves 30, 33 of local sending and receiving hosts 31, 34, respectively, connected to the Internet 36. A bastion host computer programmed with the ASD technique, hereinafter referred to as a sending ASD peer 32 or receiving ASD peer 35, protects each enclave. A bastion host is a gateway between an inside network and an outside network. Conventional routers 38, 37 are coupled to the ASD peers 32, 35 and connect the ASD protected enclaves 30, 33 to the Internet 36. A private WAN can also be connected between the ASD protected enclaves.

Figure 2:
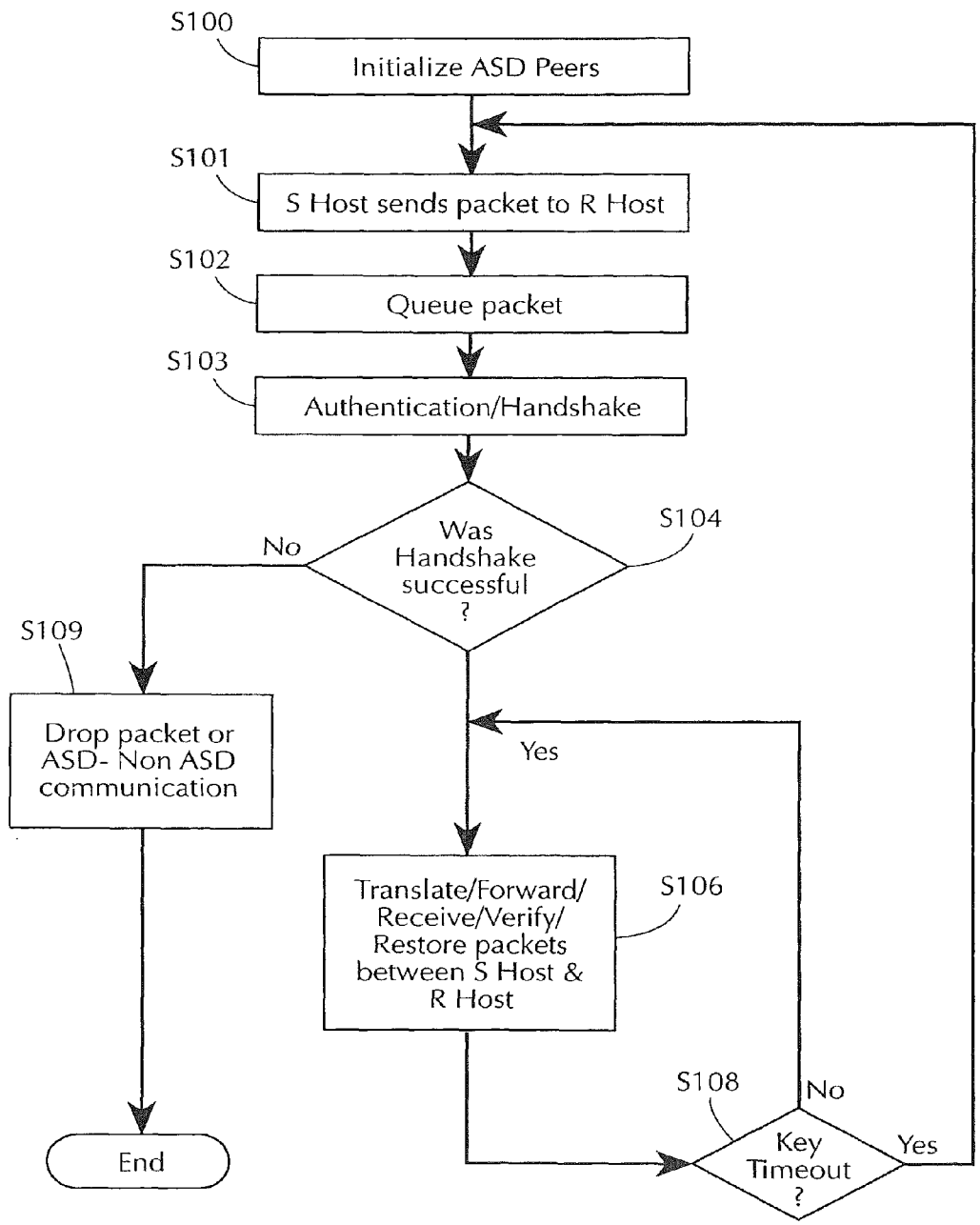
FIG. 2 is a flowchart showing steps for the Adaptive Self-Synchronized Dynamic Address Translation technique in accordance with an embodiment of the present invention.

FIG. 2 is a flow chart describing the steps involved in a preferred embodiment of the ASD method of the present invention. In this embodiment, in step S100, an ASD administrator pre-configures the ASD peers 32, 35 with security information to support a secure exchange of packets. This pre-configuring operation allows enclaves to maintain predetermined security associations with each other by prearranging which enclaves are ASD protected enclaves, which encryption algorithms are being used for each particular ASD enclave, timeout information, and information necessary for generating an encryption key. Preferably, this security information is located in the ASD peers 32, 35, and is in the form of tables called out-of-band (OOB) configuration tables.

The ASD peers 32, 35 and their respective tables are preferably managed by software called OOB management software. The OOB management software allows remote access to secure ports on the ASD peer by systems administrators, to allow them to configure the ASD peers 32, 35, and the OOB configuration tables.

Next, as shown in step S101, to initiate a transmission of information over the network, a sending host 31 sends a packet to a receiving host 34. The sending host 31 sends the packet by looking up the IF address of the receiving host 34 (through a predefined host table or a search service such as Domain Name Service (DNS)), and transmitting the packet. Before the packet can leave the sending enclave 30, it encounters a sending ASD peer 32, which intercepts the packet bound for the receiving host 34 and in step S102 places it into a queue. The queue preferably is located in the sending ASD peer's 32 user-space memory. The packet is stored there until the sending ASD peer 32 and receiving ASD peer 35 have established an ASD connection.

Next at step S103, the handshake operation is performed to establish the connection between the sending ASD peer 32 and the receiving ASD peer 35. This initial communication between peers allows the peers to negotiate a symmetric cryptographic key via a secure key exchange protocol for use in encrypting packet header information.

If it is determined at step S104 that the handshake was successful, then at step S106 portions of the packet header are cryptographically translated using a translation process to be described in more detail below. If the handshake operation is unsuccessful, then in step S109, the packet is dropped. Future connections from the sending device can then be ignored.

The encrypted portions of the packet header are those portions relating to the source and destination hosts 31, 34 and packet sequencing information. In this embodiment, the packets include class-C addresses routable over the Internet. Class-C addresses use 24 bits for the network portion of the address, and 8 bits for the individual machine portion of the address. Those skilled in the art will appreciate that ASD could be tailored for use with other address classes, in which case the number of bits used for the network address will differ. Note, however, that the network portions of the source and destination addresses (e.g., the upper 24 bits of a class-C packet) are not encrypted, thus allowing the packets to be routed on the Internet 36.

Once translated, this encrypted packet is transmitted across the Internet 36 to the destination enclave 33, targeted to the receiving host 34. The receiving ASD peer 35 intercepts the packet once it has reached the destination enclave 33 and verifies by examining the unencrypted (network) portion of the source address that the received packet came from an ASD protected enclave 30. If the sending enclave is recognized as a trusted enclave, the receiving ASD peer 35 restores the packet in accordance with the prearranged protocol. The result of this process is a restored packet identical to the original packet created by the sending host 31.

The packet is then forwarded, typically by enclave TCP/IP routing procedures and hardware, to the receiving host 34. For information going in the other direction the receiving ASD peer 35 will take on the role of a sending ASD peer 32, and can send packets from host 34 within its enclave 33 back to the original sending ASD peer 32 using the same prearranged translation process. Once the initial packet has been received, follow-on packets can be delivered and individually translated until a key timeout occurs (step S108). If it is determined in step S108 that a key timeout has occurred, the old key information is erased from memory and the flow loops back to step S101 to wait for another packet from sending ASD peer 32. Subsequent receipt of a packet from sending ASD peer 32 will activate the handshake operation again to negotiate a new key.

By such frequent, asynchronous remapping, the per-packet cryptographic technique described above offers a degree of address obfuscation that has not heretofore been provided, and continually changes a protected network's appearance to the outside world, adding a critical layer of defense against both passive network mapping attempts and active penetration attacks.

A preferred embodiment of the packet translation process will next be discussed in more detail with reference to Tables 1, 2 and 3 and FIGS. 3 and 4. Table 1 illustrates the fields of a conventional TCP/IP packet.

TABLE 1

| IP | Ver. | IHL | TOS | Total Length | | TCP | Source Port | Destination Port |
|---|---|---|---|---|---|---|---|---|
| | Identification | | | Flags | Fragment Offset | | Sequence Number | |
| | Time to Live | | Protocol | Header Checksum | | | Acknowledgement Number | |

TABLE 1-continued

| Source Network Address | Src Host Addr | Offset Reserved (Bits) | Window |
|---|---|---|---|
| Destination Network Address | Dest Host Addr | Checksum | Urgent Pointer |
| Options + Padding | | Options + Padding | |

The translation process of the present invention encrypts certain fields from the original TCP/IP header (shown in Table 1 in boldface type) to hide the host's location. The fields to be encrypted are first extracted, by the ASD peer, from the original TCP/IP packet. Those fields are the: Identification, Source Host portion of the Source Address, Destination Host portion of the Destination Address, Source Port, Destination Port, Sequence Number, Acknowledgement Number, and Padding parameters. The extracted fields are then packed into a byte array for further processing.

Figure 3:
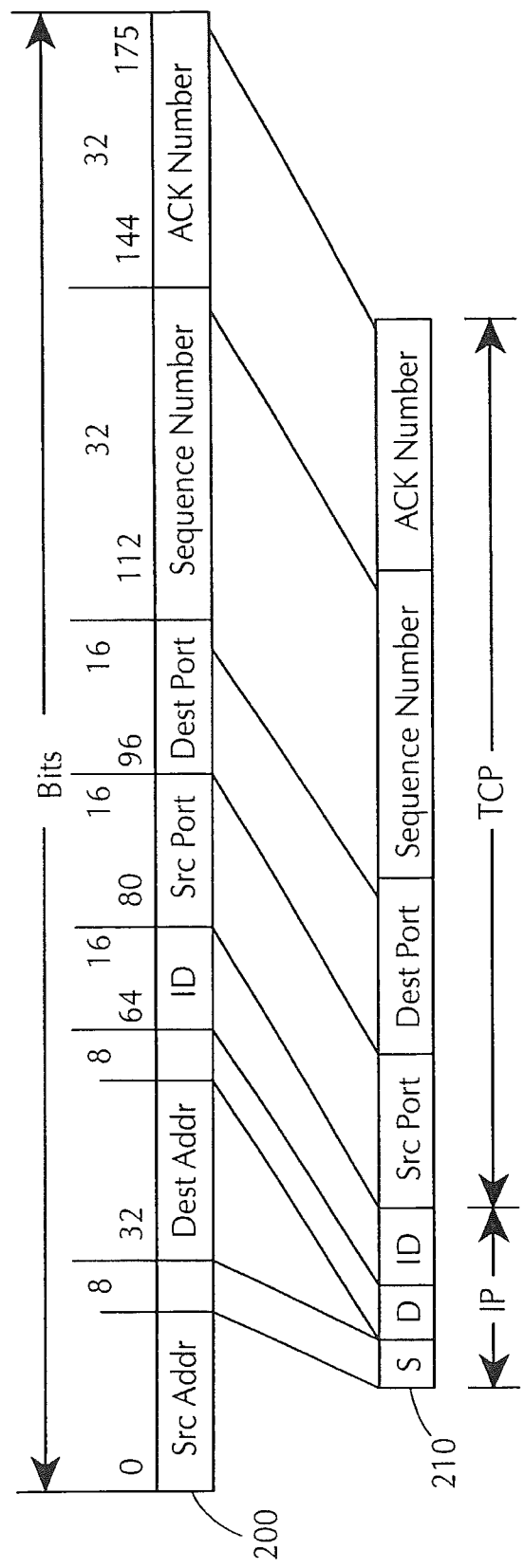
FIG. 3 illustrates how extracted TCP/IP fields are packed into an unencrypted byte array in accordance with the subject invention.

FIG. 3 illustrates how the extracted TCP/IP fields of a class-C addressable packet 200 are packed into an unencrypted byte array 210. In the preferred embodiment, the addresses are class-C type addresses. Therefore, only the lower 8-bits of the IP source and destination addresses are packed into the unencrypted byte array 210, thus preserving the network address (i.e., upper 24 bits) of the original packet. This is done to assure delivery to the destination network, and hence the receiving ASD peer 35. Next, the unencrypted byte array 210 is encrypted.

Figure 4:
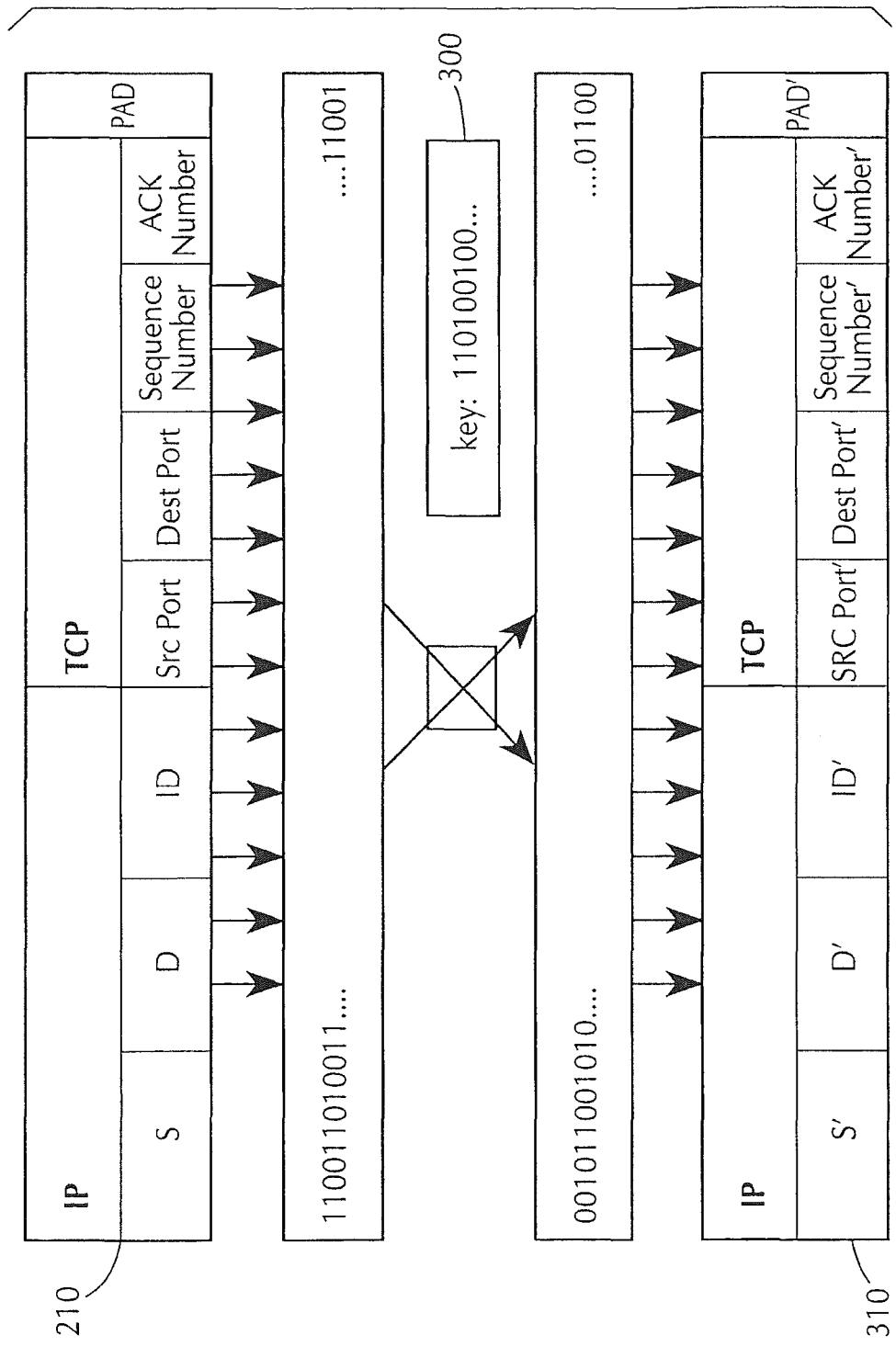
FIG. 4 illustrates the encryption process in accordance with the subject invention.

FIG. 4 illustrates the encryption process. The unencrypted byte array 210 is encrypted with the encryption key 300, agreed upon during the handshake operation, to form an encrypted byte array 310. There are various types of known block cipher algorithms available for doing symmetric encryption such as for example RC5™, created by RSA Securities Incorporated, Data Encryption Standard (DES), Blowfish, Twofish, Advanced Encryption Standard (AES), etc. In order to encrypt, these block cipher algorithms require a specific N-bit blocksize of data, where N is the number of bits as prescribed by the algorithm (e.g., 64 for DES), per encryption operation. Accordingly, if the data size is less than N-bits, padding can be added to the unencrypted byte array 210 to make the total length equal to N-bits.

Next, the encrypted byte array 310 elements are placed back into the original packet header, in their corresponding positions.

Table 2 illustrates how the contents of the encrypted byte array 310 are repacked into the original TCP/IP packet header, thereby replacing the old (original) information. The packet header at this point is said to be translated. Once translated, this packet is transmitted across the Internet 36 to the destination enclave 33, targeted to the receiving host 34.

ber, Acknowledgement Number, and Padding are extracted and packed into a byte array. Then the byte array is run through the symmetric cryptographic algorithm to decrypt it, using the negotiated key. The restored parameters are copied into the packet header, overwriting the original fields. The result is a restored header now resembling the original packet header created by the sending host 31. The packet is then forwarded to the receiving host 34, completing delivery.

As can be seen with reference to Table 2, in the present invention, the encrypted information is copied into ordinary packet header format giving the appearance to an outside observer of being cleartext representations. This distinguishes the ASD technique from technologies such as IPsec tunnel mode, which actually encrypt the datagram and do not attempt to copy its parameters into the context of a normal packet. The difference is that ASD packets look like real packets; IPsec packets look like encrypted packets enveloped in a point-to-point packet. The ASD technique, however, seamlessly layers with data security technologies such as IPsec and Secure Sockets Layer (SSL) because it only affects addressing and sequencing information for translation/restoration, allowing it to be used to enhance existing network security systems.

Furthermore, routers 37, 38, firewalls, switches, hubs, network address translation (NAT) devices (not shown), and the like, can be used in conjunction with the ASD technique. Those skilled in the art also will appreciate that ASD, NAT, switch, hub, firewall devices and the like, may be separately provided or may be engineered into one host (or hardware unit).

Note that there may be a situation where an unchanging N-bit blocksize is being encrypted by an N-bit block cipher algorithm. An example is the bit block used to store the TCP source and Destination Ports: port values remain fixed from packet to packet, for the life of the connection. In this case, the resulting encrypted block would remain constant from packet to packet. However, exclusive ORing (XORing) the N-bit unchanging block with a field that does change per-packet (e.g., sequence parameter) and then encrypting that new block overcomes this. The receiving ASD peer 35 need only decrypt in the usual manner, and then XOR the decrypted N-Bit block with the same changing parameter to return to the same original block of data. For example, TCP Source Port

TABLE 2

| IP | Ver. IHL TOS | Total Length | TCP | Source Port' | Destination Point' |
|---|---|---|---|---|---|
| | Identification' | Flags Fragment Offset | | Sequence Number' | |
| | Time to Live Protocol | Header Checksum | | Acknowledgement Number' | |
| | Source Network Address' | Src Host Addr' | | Offset Reserved (Bits) | Window |
| | Destination Network Address' | Dest Host Addr' | | Checksum | Urgent Pointer |
| | Options + Padding' | | | Options + Padding' | |

The destination ASD peer 35 intercepts the packet, verifies that it came from the sending enclave 30 and that the sending enclave 30 is trusted, and proceeds to restore the packet header back to its original form. Restoration proceeds similarly to translation: first, packet header data: Identification, Source Host portion of the Source Address (i.e., lower 8-bits), Destination Host portion of the Destination Address (i.e., lower 8-bits), Source Port, Destination Port, Sequence Numcan be XOR'd by the TCP Sequence Number to achieve a more pseudo-random cryptographic effect.

Figure 5A:
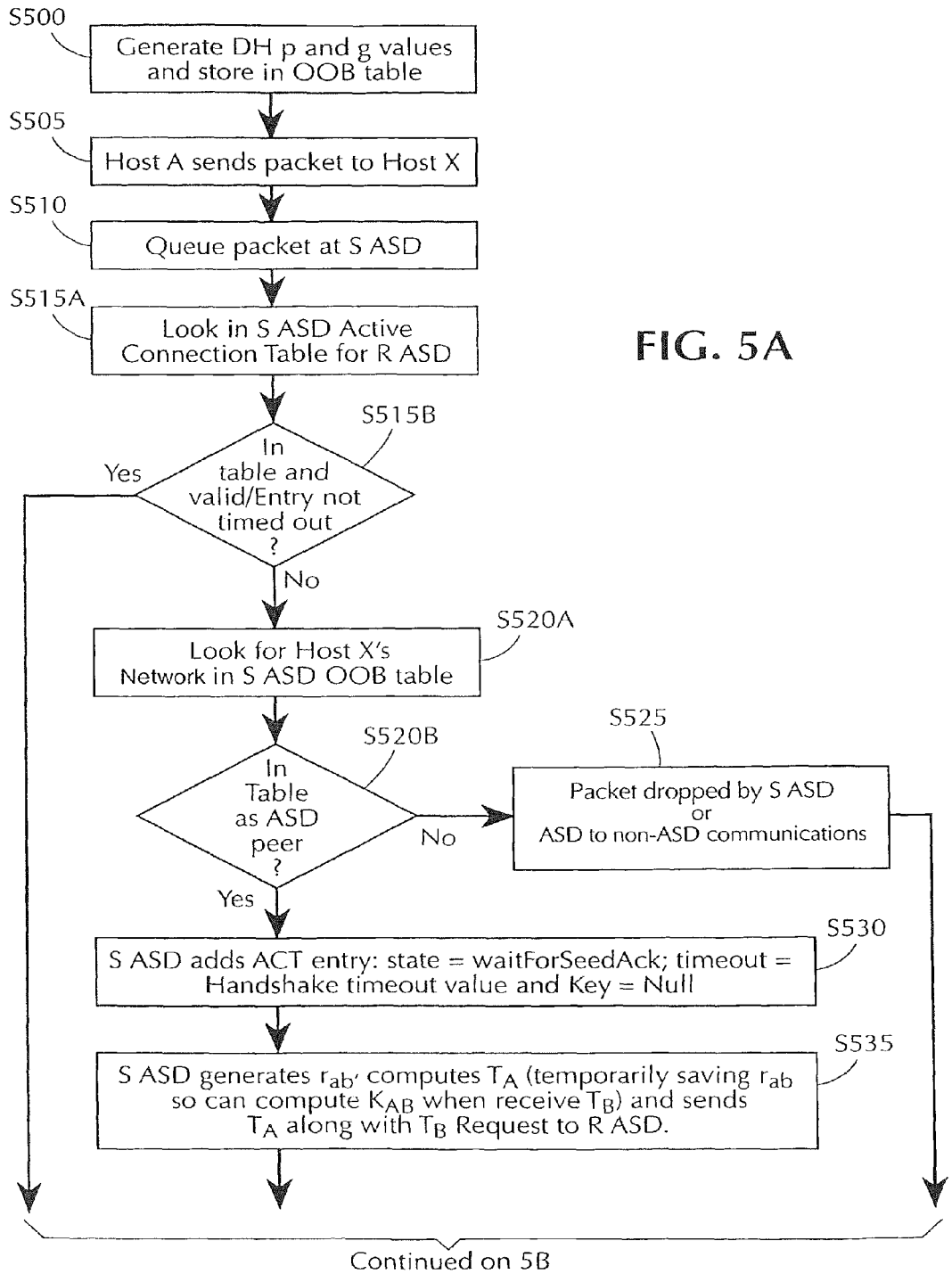
FIGS. 5A and 5B are a flowchart showing steps for the handshake operation between ASD peers in accordance with the subject invention.
Figure 5B:
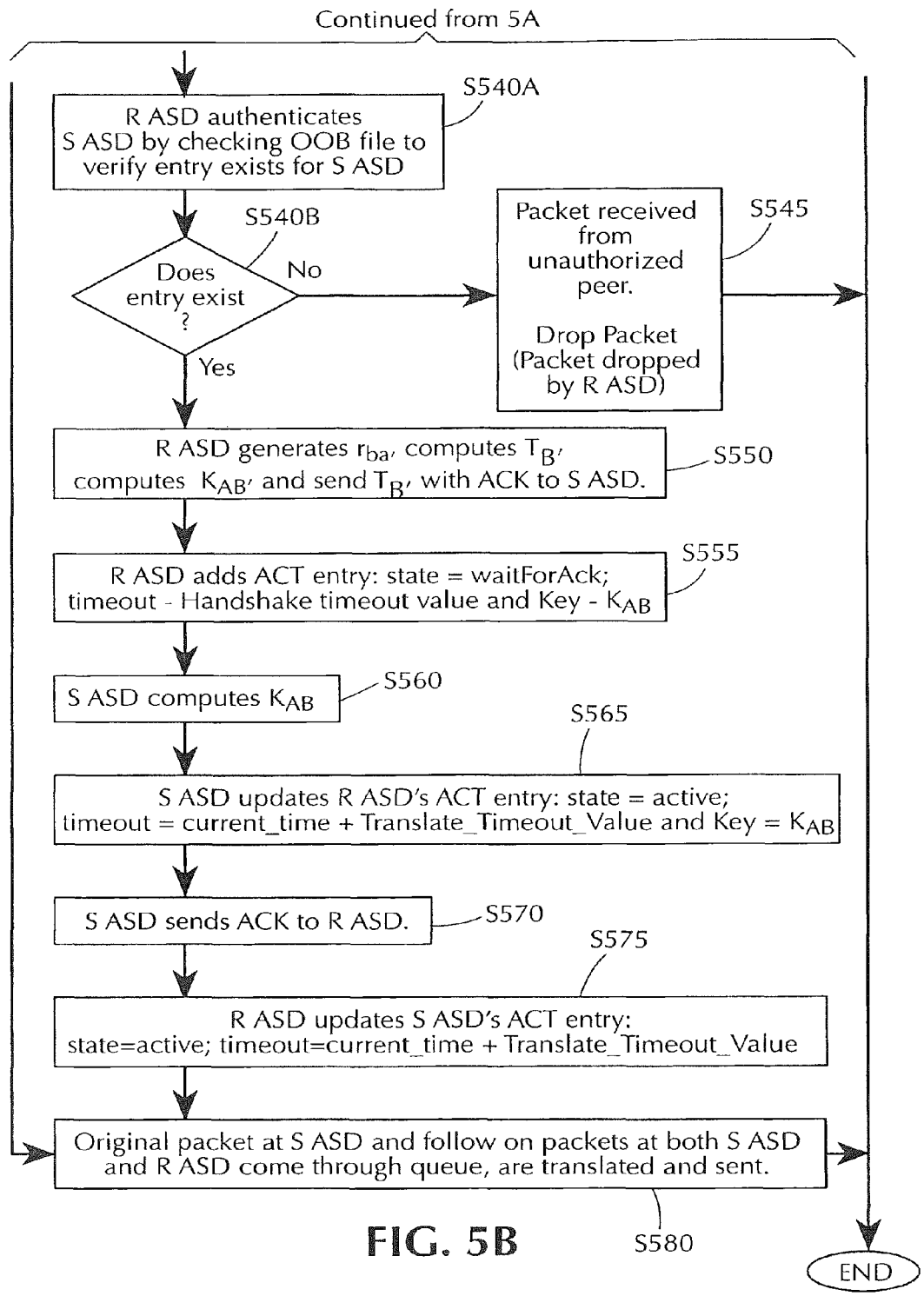

A preferred embodiment of the handshake operation between ASD peers will next be described with reference to the flowchart of FIGS. 5A and 5B. The key establishment handshake operation authenticates ASD peers and negotiates a symmetric cryptographic key used for translating the packets. The flow chart in FIGS. 5A and 5B makes reference to elements from the network configuration illustrated in FIG. 1.

One known technique used for exchanging key information is the Diffie-Hellman technique. Diffie-Hellman is a key agreement algorithm used by two parties to agree on a shared secret. The resulting keying material is used as a symmetric encryption key. When using the Diffie-Hellman key exchange, seed information is represented by prearranged "p" and "g" values (i.e., 1024 bit numbers). Accordingly, in step S500, the "p" and "g" values are initialized for deriving symmetric keys. Preferably, each party involved in the exchange stores these values in the Keying Information parameter of the OOB table, to be described in detail below.

Next, in step S505, an ASD key establishment handshake is triggered by initial traffic between two ASD peers. This can occur, for example, when a sending host 31 sends a packet to a receiving host 34. Note that an ASD key establishment handshake can also be triggered by an expired timeout value during data transmission. Such a non-initial handshake is referred to as a resynchronization. Resynchronization forces a new symmetric key to be generated in order to keep changing the key values. The use of periodic or random resynchronization is preferred since the probability of encryption keys becoming compromised increases with time.

At step S510, the packet is queued at the sending ASD peer 32, that is, the packet being sent from a sending host 31 to receiving host 34 must wait at the ASD peer 32 until the handshake operation completes. Because the kernel has the capability to queue the packets, overflow of packets at the sending ASD peer 32 should not become an issue.

At steps S515A and S515B, it is determined if a handshake is required. To make the determination, in step S515A, an Active Connection Table (ACT), to be described in detail below, is queried for the destination ASD peer's information, including whether an active connection still exists. For example, the network information of other ASD peers may be available but their corresponding symmetric keys might not, or their timeout parameters may have expired. In that event the connection state is inactive for those two peers.

An active connection is considered to exist if the sending and receiving ASD peers have previously negotiated a symmetric key and the lifetime of that key has not expired (timed-out). If it is determined at step S515B that an unexpired active connection exists, then the flow proceeds directly to step S580: the original packet previously queued in the sending ASD peer 32 comes through the queues, is translated and sent. In addition, the follow on packets at both the sending ASD peer 32 and the receiving ASD peer 35 are also sent through their respective queues, translated, and sent.

If the receiving ASD peer 35 is not found in the sending ASD peer's 32 ACT table, or the entry has timed out, the synchronization program proceeds to steps S520A and S520B to determine whether the receiving host's 34 network (i.e., upper 24 bits of address) is in the sending ASD peer's 32 OOB table. To make the determination, in step S520A, the sending ASD peer's OOB table is queried for the sending host's network address. If it is determined in step S520B that the receiving host's network is not in the OOB table, the packet may be dropped or an ASD to non-ASD communication session may be initiated as shown in step S525.

If the receiving host's network is determined to be an ASD peer, at step S530, entries to this effect are added to the sending ASD's 32 ACT table. At this point the handshake operation has not negotiated a symmetric key, therefore the keys are set to default initialization values. Certain ACT table parameters also are initialized at this time. For example, the ASD Pair State is set to a value representing a wait state ("wait for seed acknowledgement") representing waiting for a seed acknowledgement message from the receiving ASD peer 35. The Timeout Value parameter is set to a value representing how long an attempt to negotiate a key should last ("handshake timeout"). The ASD Pair Symmetric Key parameter is set to Null since this is the value being sought by the handshake operation.

Next, at step S535, the sending ASD 32 generates a seed $T_A$ derived from the Diffie-Hellman key exchange formula: $T_A = (g\hat{\ }r_{ab})$ mod p, where p and g are the seed values initialized in step S500, and $r_{ab}$ is a random number. The sending ASD peer then sends $T_A$ to the receiving peer 35. Along with $T_A$, the sending ASD peer 32 sends a request for the other seed ($T_B$) required to generate a symmetric cryptographic key $K_{AB}$. Step S535 also saves $r_{ab}$ for generating $K_{AB}$ after receiving $T_B$.

At step S540A, the receiving ASD peer 35 authenticates sending ASD peer 32 by checking its OOB table to verify an entry exists for the sending ASD peer 32. If it is determined in step S540B that an entry does not exist then the sending ASD peer 32 is not authenticated and, at step S545, the receiving ASD peer 35 drops the packet. Additionally, the receiving ASD peer may reply to the sending host with falsified source, destination and identification information to hide the fact that an ASD protection device is being used on the network.

If it is determined in step S540B that an OOB entry does exist for the sending ASD peer 32, then the receiving ASD peer 35 accepts the seed $T_A$ at step S550, and the receiving ASD peer 35 computes its seed ($T_B$). $T_B$ is derived from the Diffie-Hellman key exchange formula: $T_B = (g\hat{\ }r_{ba})$ mod p, where g and p are the seeds initialized in step S500 and $r_{ba}$ is another random number generated within the receiving ASD peer 35. The receiving ASD peer 35 then uses $T_A$ to compute the symmetric key ($K_{AB}$) using the formula $K_{AB} = (T_A\hat{\ }r_{ba})$ mod p.

Next, in step S550, the receiving ASD peer 35, sends $T_B$, along with an "acknowledge" message, to sending ASD peer 32. At step S555, the following values are stored into the receiving ASD peer's 35 ACT table: the sending ASD peer's 32 Timeout Value, the ASD Pair Symmetric Key $K_{AB}$, and the ASD Pair State value is set to "wait for an acknowledge". These parameters are stored in the array identified as the sending ASD peer's 32 array. The receiving ASD peer 35 then waits for acknowledge from sending ASD peer 32 before it will send more packets. Next, in step S560, the sending ASD peer 32, computes $K_{AB}$ using the formula $K_{AB} = (T_B\hat{\ }r_{ab})$ mod p, where $r_{ab}$ is the random number generated in the sending ASD peer, p is the pre-configured random number seed, and $T_B$ is the seed generated by the receiving ASD peer 35.

In step S565, the sending ASD peer 32 updates its ACT table with regard to receiving ASD peer 35. Thus, the sending ASD peer's ACT table is updated with ASD Pair State set to "active", ASD Pair Symmetric Key becomes $K_{AB}$, and Timeout Value becomes the current time (or some reference time) plus a translation timeout.

Next, in step S570, the sending ASD peer 32 sends the receiving ASD peer 35 an acknowledge message. This message causes the receiving ASD peer 35 to modify its ACT table with respect to the sending ASD peer 32, as shown in step S75. The parameters modified are: ASD Pair State to "active", and the Timeout Value to the current time (or some reference time) plus a translation timeout.

Referring to step S580, at this point, an active connection exists. Therefore the original packet previously queued in the sending ASD peer 32 comes through the queues, is translated and sent. In addition, the follow-on packets at both the sending ASD peer 32 and the receiving ASD peer 35 are also sent through their respective queues, translated, and sent.

As stated above, in the preferred embodiment, a Diffie-Hellman key exchange algorithm is used to establish a key. However, those skilled in the art will appreciate that other key exchange algorithms can be used, such as for example the FORTEZZA, RSA Key Exchange, SKIP, Photuris, Oakley, Internet Key Exchange algorithms, and still be within the scope of the invention. Also, other methods of exchanging key information can be used and still be within the scope of the invention. For example, a manual method may be substituted for the technique described above. A manual method would entail having an administrator physically load onto the ASD peers a symmetric key rather than have the key negotiated automatically by the ASD peers' handshake operation.

Figure 6:
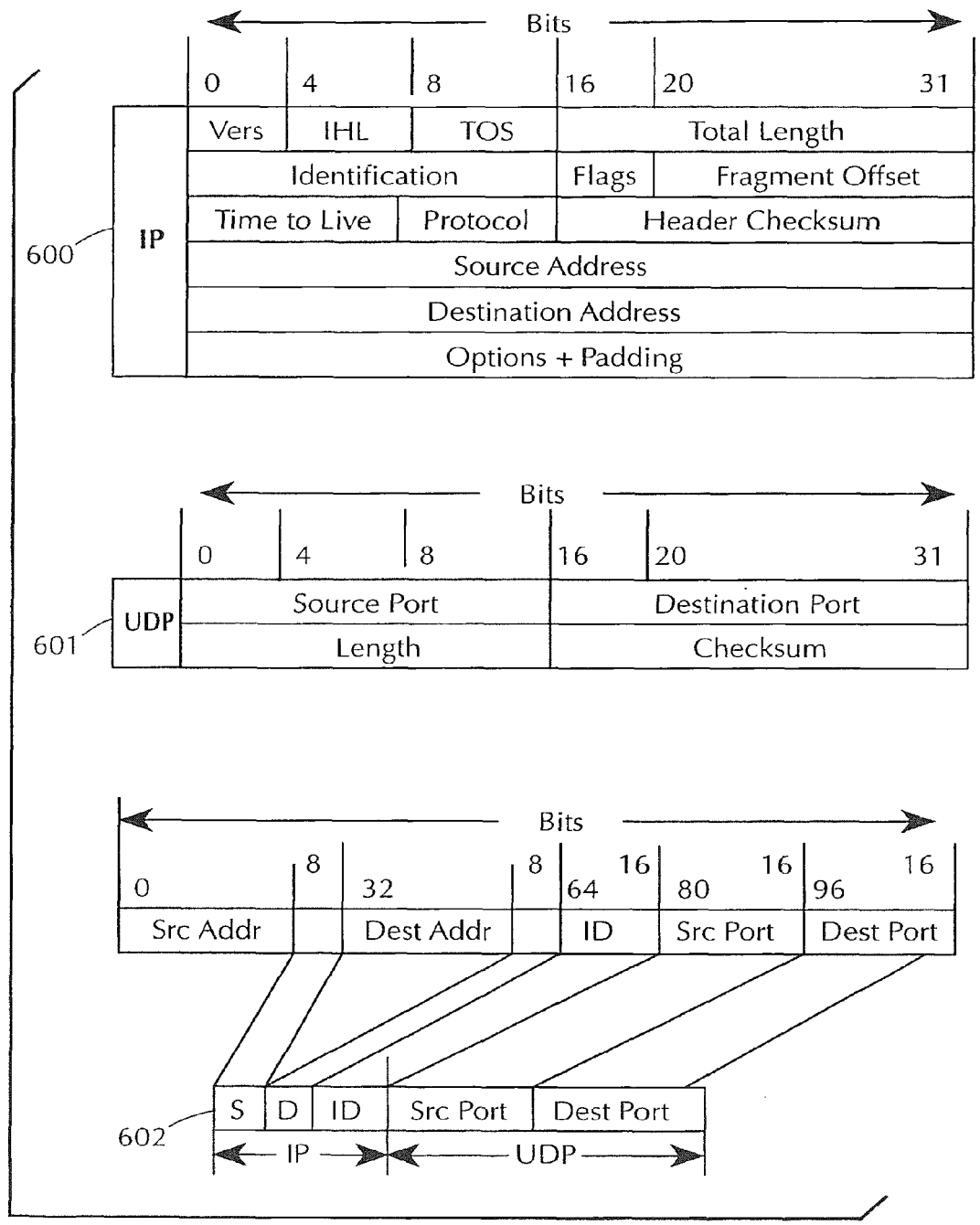
FIG. 6 illustrates a UDP/IP header in accordance with the subject invention.

The handshake operation can use UDP/IP packets to transmit the handshake key exchange information in a manner that thwarts attempts at mapping a network during a handshake operation. FIG. 6 illustrates a UDP/IP header 602. The packet header takes the form of an IP header 600 followed by a UDP header 601.

The receiving ASD peer 35 must know that this packet is for the handshake operation. Therefore, in the IP header, the Type of Service (TOS) parameter is encoded with a value representing a handshake operation (e.g., 101). It will be appreciated that other locations within the header can be used to identify the purpose of the header.

The other fields are set to normal values (e.g., Protocol="UDP", checksum, etc.). The information that follows the translated UDP/IP header 602 is the handshake data (i.e., random key numbers $T_A$ and $T_B$, and acknowledge data). The ACT Table mentioned above is now explained in detail.

TABLE 3

| ASD Network Address$_N$ | ASD Network Address$_{N+1}$ | ASD Network Address$_{N+2}$ |
|---|---|---|
| ASD Pair State$_N$ | ASD Pair State$_{N+1}$ | ASD Pair State$_{N+2}$ |
| ASD Pair Symmetric Key$_N$ | ASD Pair Symmetric Key$_{N+1}$ | ASD Pair Symmetric Key$_{N+2}$ |
| ASD Pair Translation Algorithm Reference | ASD Pair Translation Algorithm Reference$_{N+1}$ | ASD Pair Translation Algorithm Reference$_{N+2}$ |
| Timeout Value$_N$ | Timeout Value$_{N+1}$ | Timeout Value$_{N+2}$ |

An ASD peer can communicate with various other ASD peers. Therefore, each ASD peer maintains an ACT table that includes arrays of information about other ASD peers. One of the items included in the table is the ASD Network address parameter. The ASD network address parameter is the network address of other ASD peers (i.e., the upper three bytes of a Class-C IP address). Table 3 shows exemplary information arrays for three different ASD networks. For purposes of illustration, one array is indicated with subscript N, another with subscript N+1, and a third with subscript N+2. In accordance with the preferred embodiment of the present invention each ASD peer's encryption key has been separately negotiated. Thus, even if the ASD$_N$ can see the traffic going between ASD$_{N+1}$ and ASD$_{N+2}$, it can not decrypt the information because it does not have the right key.

The ASD Pair State parameter is a parameter used to tell an ASD peer whether the connection between it and the peer for which the parameter is stored is active. The ASD Pair Symmetric Key parameter is the negotiated key for that pair of peers, if one already exists. It is also used to store temporary values while a handshake operation is in progress.

The ASD Pair Translation Algorithm Reference parameter identifies which algorithm, from among the available encryption algorithms discussed above, is being used between that pair to encrypt and decrypt the TCP/IP parameters. As mentioned above, there are various types of algorithms available for doing symmetric translation such as for example RC5™, created by RSA Securities Incorporation, defense encryption standard (DES), Blowfish, Twofish, etc. In addition, asymmetric (public-key) algorithms may be used for translation, including the RSA algorithm or Elliptic Curve Cryptography (ECC) algorithms, as an example.

The Timeout Value parameter is the symmetric key lifetime. If a packet has been sent and the timeout value has expired, another handshake must occur to obtain another symmetric encryption key. In turn the symmetric key field would then be updated with the new key. It will be appreciated by those skilled in the art that periodic rekeying of a cryptographic system provides added protection against key discovery.

Table 4 summarizes a preferred OOB configuration table. The OOB table is used to control behavior of the ASD and is read in by the ASD at startup time; the OOB dictates which network is being protected and provides the list of authorized peer hosts among other things. Since altering the OOB configuration tables can disable existing and future communications, those tables should reside in a secure file or directory. Alternatively, they can exist in rewritable hardware such as, for example, an EPROM.

TABLE 4

| Network Protected Network Range Utilization | | |
|---|---|---|
| Approved ASD Peer Networks N | Approved ASD Peer Networks N + 1 | Approved ASD Peer Networks N + 2 |
| ASD Peer Range Utilization N | ASD Peer Range Utilization N + 1 | ASD Peer Range Utilization N + 2 |
| Translation Scheme N | Translation Scheme N + 1 | Translation Scheme N + 2 |
| Keying Information N | Keying Information N + 1 | Keying Information N + 2 |
| Timer Information N | Timer Information N + 1 | Timer Information N + 2 |

The Network Protected parameter is the address of the enclave protected by the ASD peer using the table. The Network Range Utilization parameter provides the addresses apportioned for use with the ASD technique. This permits an ASD administrator to decide whether all or some of the available addresses will be used for the translation process. If, for example, out of 256 possible addresses, an administrator decides to use 128 addresses, an adversary using a network sniffer on the Internet will see all the chosen 128 addresses being used fairly evenly—even if, for example, there are only five hosts installed on the network.

The Approved ASD Peer Networks parameter identifies ASD peers and enclaves approved for ASD-to-ASD communication. If a host attempts to send a packet addressed to a network not listed in the table then the packet can be dropped or ASD to non-ASD communications can take place (another embodiment of the present invention, discussed below). The network address space also can be partitioned into a subset of ASD addresses (true IP addresses), addresses reserved for configuration and/or seed exchange (management addresses), and addresses reserved for other purposes.

The ASD Peer Range Utilization parameter identifies how the peer ASD network is partitioned into ASD addresses. For example, in a range of addresses of 0-128, if hosts 0-9 are being used for non-ASD purposes, then an offset can be established in this parameter to change the range of addresses available for the ASD peer to 10-138. This is similar to the network range utilization, but for the remote peer; there is one entry per remote peer.

The Translation Scheme parameter holds the type or types of translation algorithms to be used for translation of the packet data. This parameter can include a preferred algorithm or a list of algorithms available to other peers. Thus, another embodiment of the invention may not only negotiate a key, but also negotiate the algorithm that uses that key. The list of algorithms also can be cycled to vary which one is being used at any given time, and could also be selected in response to intruder activity, favoring a more robust algorithm over a more efficient one in times of active threat.

The Keying Information parameter is used by the local ASD with each ASD peer to securely establish key information during the handshake. As described above, one technique used for securely exchanging key information is the Diffie-Hellman technique. Diffie-Hellman is a key agreement algorithm used by two parties to agree on a shared secret. The resulting keying material is used as a symmetric encryption key. When using the Diffie-Hellman symmetric key exchange the seed information will be prearranged "p" and "g" values (i.e., 10^24 bit numbers) stored in the Keying Information parameter. Note, that the "p" and "g" values used with Diffie-Hellman symmetric key exchange can be generated offline by a separate stand-alone tool. As stated above, those skilled in the art also will realize that other key agreement algorithms can be used in lieu of the Diffie-Hellman technique.

The Timing Information parameter identifies information needed to control handshake timeout settings and number of retries, and peer-to-peer lifetime information.

In the preferred embodiment, the OOB configuration table can be updated during ASD operation without affecting the operation. Should updates be made to the configuration information during ASD operation, the changes will not take place until the ASD is specifically notified to update to the new settings. In the event that changes are made during ASD down-time, the new configuration can become active when the ASD is brought back up. If dealignment occurs (i.e., where the sending ASD has different values in its configuration file than the receiving ASD does), an ASD administrator can reinitialize the dealigned parameters. The COB Configuration table also can be updated when ASD addresses change, Management/Configuration addresses change or Fixed/Reserved outside address space changes.

If the fixed outside addresses run out but there exists a need to add another outside device, the effect will be that all peer ASD devices will need to update their configuration information about the local peer or enclave. For example, if the ASD peer utilization range was set to 256 (out of 256 possible addresses) and a new outside address is needed, the range of ASD-occupied addresses can be reduced to 128 free reserved addresses. This would affect the previously configured OOB tables and require changes to both the local ASD peer and authorized remote peers that may wish to communicate with the local peer. However, a new range of addresses could be negotiated during the handshake, thereby taking into account new outside devices and minimizing out of band reconfiguration.

As described above, an ASD administrator pre-configures the ASD peers with security information to support a secure exchange of packets. This pre-configuring operation allows enclaves to maintain predetermined security associations with each other by prearranging which enclaves are ASD protected enclaves, which encryption algorithms are being used for each particular ASD enclave, timeout information, and information necessary for generating an encryption key. OOB management software allows systems administrators to configure OOB configuration tables prior to communicating with other ASD peers (and their trusted hosts) or external hosts (untrusted hosts).

In the preferred embodiment, the ASD technique of the present invention is to be implemented as software modifications to the central module of an operating system (kernel) on a bastion host. At a minimum, such software includes code for the key establishment handshake as well as code for the header information translation.

In another embodiment, the ASD technique of the present invention is to be implemented as a software or hardware modification to a network card. A network card includes a transceiver, memory and a microprocessor programmed to communicate packets to and from a network. Accordingly, it will be appreciated that the network card, programmed with the ASD technique, can be coupled to a bastion host and provide the same advantages described above as having the ASD technique programmed into the OS kernel.

Various dealignment situations can be accounted for automatically. For example, if the sending ASD peer 32 sends a packet to the receiving ASD peer 35 with the ASD Pair State set to "active" and with a previously negotiated key "$K_{AB}$" but the receiving ASD peer 35 does not recognize the sending ASD peer 32, then the receiving ASD peer 35 should first look in its OOB configuration file to see if it recognizes the sending ASD peer 32. If it does then the receiving ASD peer 35 can initiate a handshake with the sending ASD peer 32 causing the sending ASD peer 32 to create new $r_{ab}$, $T_A$ and $K_{AB}$ values. The receiving ASD peer 35 will have to drop the packet and sending host 31 should retransmit the packet. Similarly, if the sending ASD peer 32 tries to communicate with the receiving ASD peer 35 after the receiving ASD peer 35 reboots, the receiving ASD peer 35 may not have an entry for the sending ASD peer 32. Thus, the sending ASD peer 32 will have to replace the receiving ASD peer's 35 entry in its ACT during resynchronization.

Yet another embodiment of the present invention relates to ASD to non-ASD communications. Referring to FIG. 2, step S109 and FIGS. 5A and 5B, step S525, when a packet is sent by an ASD peer whose ACT and OOB tables do not include the receiving ASD peer's network address, the packet is either dropped or an ASD to non-ASD communications session results. If an ASD to non-ASD communications session is to ensue, the sending ASD peer must take into account that the receiving machine cannot handle key exchanges, translate packets or restore encrypted packets. The ASD to non-ASD communications technique hides the sending ASD host's identity, thereby preventing an adversary from mapping the sending enclave's topology but leaves intact the packet header's destination information.

Figure 7:
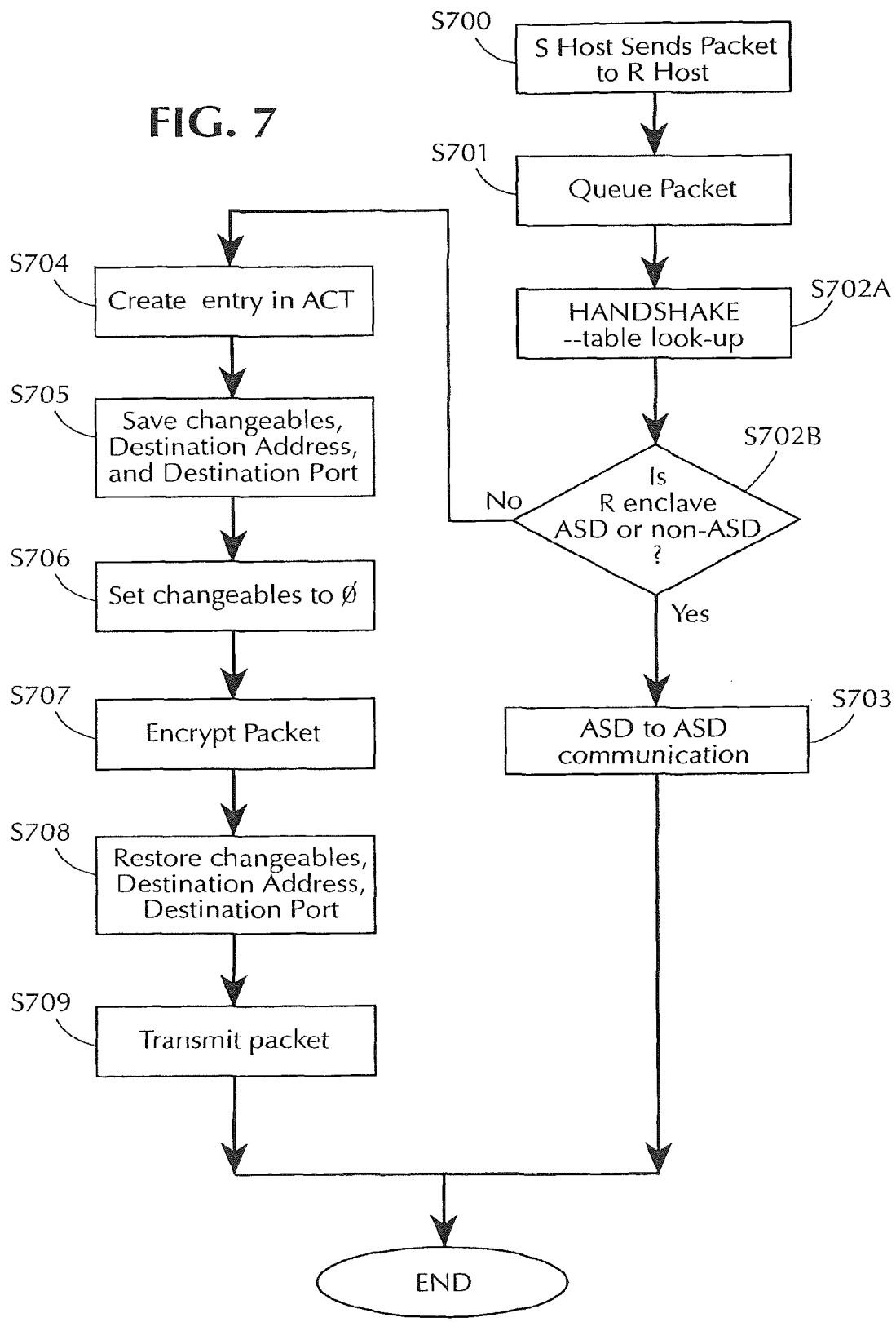
FIG. 7 is a flowchart showing steps for sending a packet to a non-ASD protected enclave.

FIG. 7 is a flowchart of the steps involved in sending a packet to a non-ASD protected enclave. Initially at step S700, the sending ASD peer receives a packet for transmission out of the enclave. The sending ASD peer, in step S701, queues the packet. Next, in step S702A, a handshake operation determines whether an ASD peer protects the destination machine by looking for the destination machine's network address in its ACT and OOB tables. If the destination machine's address is found and it is determined in step S702B that an ASD peer is protecting the destination machine, then an ASD to ASD communications can take place, as shown in step S703, as described above in the ASD technique method of the present invention.

If, in step S702B, the destination network was not found, then an ASD to non-ASD communications can take place. In step S704, an entry is created in the sending ASD's ACT. This entry includes (for a TCP/IP packet) the IP identification (IDENT), Source Address (SADDR), Destination Address (DADDR), and the TCP Source Port (SPORT), Destination Port (DPORT), sequence (SEQ), and acknowledge (ACK) parameters. This entry is referred to as an encryption block. Thus, an ACT table can include the entries mentioned in the ASD technique of the present invention and various encryption blocks for the ASD to non-ASD communications technique of the present invention.

Those packet header parameters that vary for each packet are called "changeables". The changeables include the TCP sequence and acknowledge parameters, and the IP identification parameters. Since the destination machine is expecting consistent address information and the ASD-translated address information is in part determined by the changeables, these values must be coerced into remaining the same. Also, since the destination machine does not restore ASD translated packets, the Destination Address and Destination Port also remain the same.

In step S705, the changeables, the source and destination addresses and the source and Destination Port numbers are copied and temporarily stored. The changeables are, in step S706, set to zero to be able to decrypt a reply packet using the same encryption data block. The changeables are set to a fixed value of zero prior to the encryption step-doing so assures consistent encrypted Source Address information from one packet to the next, which the receiving (non-ASD) host uses to reply to the packets.

Table 5 shows the encryption block. It further shows the changeables set to zero.

TABLE 5

| IP | | | TCP | | | |
|---|---|---|---|---|---|---|
| IDENT=0 | SADDR | DADDR | SPORT | DPORT | SEQ=0 | ACK=0 |

Next, in step S707, the block is encrypted. Since a handshake operation is not required between the ASD device and the destination enclave, a key exchange for translating data need not be negotiated. Instead, a random number is generated within the ASD device and an encryption algorithm uses the random number as the key to encrypt the data. The same random number generators and translation algorithms used in ASD-to-ASD communications can be used to encrypt the header parameters in ASD to non-ASD communications.

After the encryption block is encrypted, in step 708, the original changeables, Destination Address and Destination Port are restored into the original packet header along with the encrypted Source Address (SADDR) and Source Port (SPORT). Thus, only the Source Address and Source Port remain encrypted.

As mentioned above, this is required to achieve delivery of the packet to the destination machine and provide a consistent address for the receiving non-ASD host. Finally, as shown in Step 709, the packet is transmitted. The encryption block is saved in the ACT table for decrypting a reply packet, described next in more detail.

Figure 8:
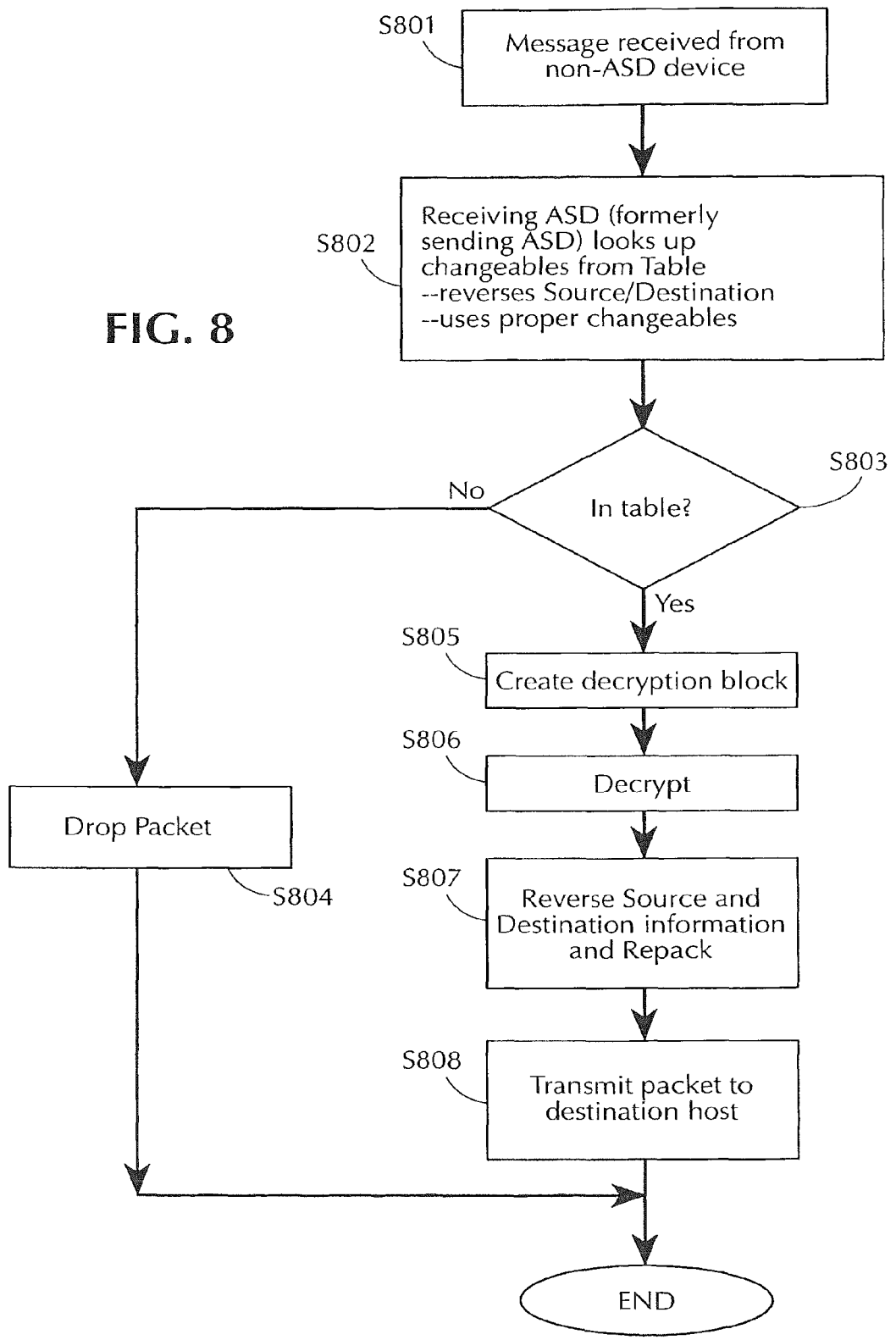
FIG. 8 is a flowchart showing steps for receiving a reply packet from a non-ASD machine.

FIG. 8 is a flowchart of steps involved in receiving a reply packet from a non-ASD machine. First, in step S801, the reply packet is received. On a TCP/IP reply packet, the source and destination information have been swapped (i.e., the destination refers to the original sending device). This reply packet includes encrypted destination information since the source information was previously encrypted when a packet was sent to the non-ASD device. Accordingly, in step S802, the ASD device looks up the encrypted Destination Address and port, and the unencrypted Source Address and Port in its ACT table (i.e., its set of encryption blocks). If, in step S803, a match is not found, step S804 drops the packet. Alternatively, the invention can return a realistic but obfuscated reply instead of dropping the packet.

If the source and destination information is found, then in step S805, a decryption block is created. The decryption block includes the identification, Source Address, Destination Address, Source Port, Destination Port, sequence, and acknowledge parameters for a TCP/IP header. These parameters must be packed into the decryption block such that, after a decryption operation, the original Source Address and Port are recovered. From the ACT table (i.e., the encrypted parameters stored in the encryption block described above), the identification, Destination Address, Destination Port, sequence and acknowledge parameters are looked up out of the ACT, and packed into their respective locations in the decryption block. These previously encrypted parameters are repacked into the block so that the values returned after decryption are the true Destination Address and Destination Port (which are at this point, stored in their respective Source Address and Port locations), and that the block will decrypt correctly.

Decrypting the reply, in other words, involves recovering the bits of the changeables which were stored prior to sending out the initial packet; these bits are used to restore the encrypted block to its original form and guarantee successful decryption of the reply. The changeables are stored since they would otherwise be lost when the original (unencrypted) values are copied in prior to transmission.

Next, in step S806, the decryption block is decrypted. Step S806 returns the true Destination Address and Destination Port (currently in their corresponding source parameter locations), but the rest of the parameters are not correct. Therefore, in step S807, the Source Address and Source Port are swapped with their corresponding Destination Address and Destination Port locations within the encryption block. Also, the original reply packet header Source Address, Source Port and changeables values are repacked into the decryption block. The result is a decryption block with true source and destination information, and with the correct changeables. The decryption block parameters are then placed back into the original TCP/IP header. Finally, in step S808, the packet is transmitted to the destination host.

While the ASD technique of the present invention is an extremely effective security device, it has a distinct property that would enable it to be an intrusion detection sensor (IDS) as well. As described above, an IDS detects intrusion attempts against a network. A typical IDS observes network traffic and detects adversarial traffic such as packets from known adversaries or packet streams that exhibit non-typical traffic patterns. For example, an IDS can detect if a printer host is attempting to connect to a secure file server. Other examples include various port- and host-based stealth scanning techniques that send slow, steady streams of packets to a range of addresses or ports, in hopes that a reply—indicating a live host or service—will be returned. Existing IDSs, however, are generally pattern- or fixed port-based and do not translate address (or identity) information, nor do they use the translated data to detect intrusion attempts. Furthermore, such IDSs are generally unable to correlate stealthy streams of packets to attacks, as in the case of slow scans.

Accordingly, the ASD technique can be modified to be an extremely effective actuator for detecting intrusion attempts. Since the host addresses for LAN machines protected by the ASD technique of the present invention appear to be constantly changing, an adversary located outside of the ASD protection perimeter would need to exactly match the address and other translated parameters in order to get a packet to a host inside an ASD protected enclave. Anything short of a perfect match would keep the ASD device from decoding the packet into a meaningful address. Any meaningless destination addresses received by an ASD peer would be tagged as undeliverable, and such packets could indicate an intrusion attempt. Several failed address decodes, such as a result of a slow scan technique, would directly indicate adversary activity.

Figure 9:
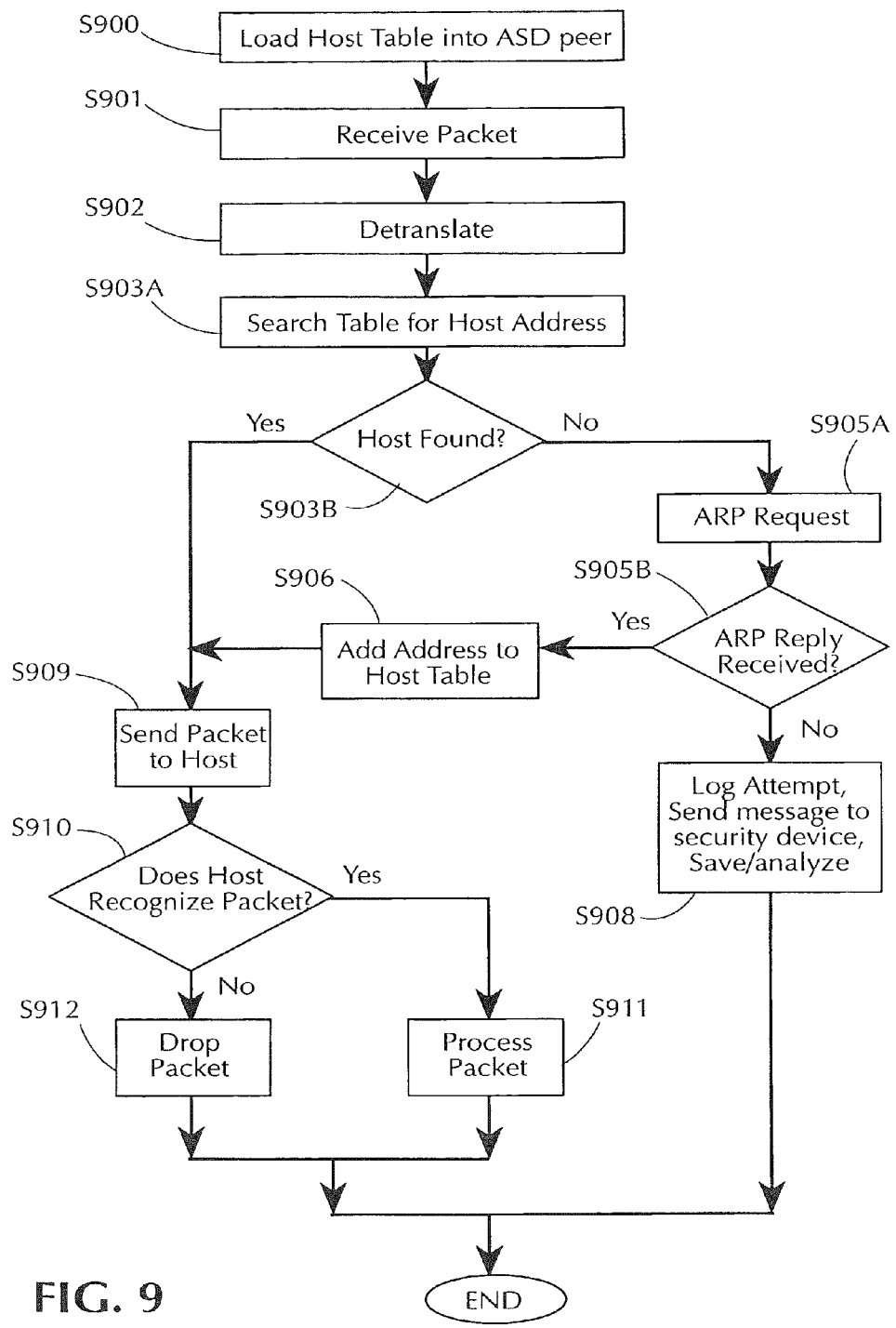
FIG. 9 is a flowchart showing steps for using the ASD technique as an IDS in accordance with the present invention.

Accordingly, the preferred embodiment of the present invention can be used as an IDS, to actuate security measures when improperly addressed packets are detected; that is, intrusion events can be identified by the ASD peer upon receiving a packet with header information that does not decrypt to a known enclave host or service. FIG. 9 is a flowchart showing steps for using the ASD technique as an IDS in accordance with the present invention. Initially, in step S900 an internal IP address cache is initialized with a list of known enclave hosts. This cache also can periodically be updated by observing general network traffic on the protected enclave; such observable traffic may consist of, but is not limited to address resolution protocol (ARP) requests/replies, and forwarded IP packets.

An ARP request, stemming from the ARP protocol, sends a message to the LAN (i.e., local enclave) in an attempt to resolve the IP address of a particular machine to its link-layer address-it can be thought of as an attempt to locate a machine. Every system on the network listens to ARP requests. When a system sees an ARP request for itself, it is required to respond with its link-layer (e.g., Ethernet) address. The system will save this addressing information in its ARP table, so future packets can be correctly encoded with the link-layer address. Most systems treat the ARP table as a cache, and clear entries in it if they have not been used in a certain period of time. For purposes of illustrating the ASD as an IDS method of the invention, the cache in the preferred embodiment of the present invention, and referred to in step 900, is an ARP cache.

At step S901, a packet comes in from a remote network. Assuming the packet had been translated according to the ASD technique of the present invention, next, in S902, the ASD translation method of the present invention (described above) detranslates the packet according to a prearranged algorithm. In S903A, the detranslated IP address is compared to the cache initialized in S900. If, in step S903B, the IP address of a host is found in the internal cache, this indicates that the address is valid and, in step S909, the packet is forwarded to its destination host.

If, in S903B the IP address is not found in the cache, an ARP request is issued, in S905A, to the protected LAN requesting an explicit resolution of the decoded address. If, in S905B, an ARP reply is received, then the address is deemed valid and the internal cache is updated with this address, shown in S906. Then, in step S909, the packet is forwarded onto the LAN directed to the destination host.

If, in S905B, an ARP reply is not received within a reasonable time interval, then the IP address is deemed invalid. [The "reasonable time interval" is defined per appropriate Internet RFCs.] If the IP address is invalid then, in step S908, the ASD peer takes appropriate action by either logging appropriate information into a log file, sending a message to a security monitoring server, or some other user-defined trigger.

The above-mentioned scenario is useful when an adversary attacks a network by guessing the destination host's address or by performing a slow scan over a range of addresses or ports. The present invention also can detect an adversary who has intercepted a packet from a valid ASD-to-ASD communications session and has attempted to affix his own data to the encrypted headers of the intercepted packet and send it into the ASD enclave. This adversarial attack is commonly known in the art as a "replay" attack. This attack would occur during an ASD to ASD communications session, after a key has already been negotiated.

In the replay situation, a packet may have correctly-encoded and detranslatable address information, and processing of that packet will thus proceed step S909. If the traffic being replayed is TCP traffic, then these packets will be rejected by the end-point host since TCP makes use of a duplicate packet rejection technique called "Sliding Window."

In TOP, a maximum amount of data is sent without having to wait for an acknowledgement (ACK). If however, an acknowledgement to a packet has not arrived for some time, the packet is retransmitted. When the packet arrives, it causes the receiving host to thereafter drop packets with previously-seen sequence numbers (values which identify packets and help with ordering), numbers whose value fall below an expected range or window of numbers. The receiving host will also drop unexpected packets, those with sequence numbers too far in advance of the window of sequence numbers it expects to see. Accordingly, even if the replayed packet arrives at the intended destination, the sequence number would detranslate into a value previously seen causing the TCP software at the receiving host to drop the packet. In addition, if the sophisticated adversary attempted to change the encrypted sequence number, the probability that the adversary correctly produce a block of encrypted bits that would detranslate to a sequence number that precisely fits within the sliding window, without having the translation key, is extremely small. The strength of this defense lies in the fact that the identity portions of the header information are encrypted on a packet-by-packet basis with the ASD technique of the present invention.

It can therefore be seen that even if the packet header information is replayed to the ASD peer causing the packet to be routed to the proper destination host, the host will drop the packet since the remaining parameters (e.g., Sequence Numbers) would be invalid—the sequence numbers would either be replayed, or guessed with a low probability of success. Accordingly, referring to step S910, if the host recognizes the packet then it will, in step S911, process it. However, if in step S910 the packet is not recognized, the host itself will drop the packet in step S912. It may be noted by those skilled in the art that further modifications may be made to the TCP/IP processing software of the protected hosts to report packets rejected for reasons of sequence number invalidity, and that these results may be handled independently similar to the processing involved in step S908 (log, send message to security device, save/analyze), providing another source of data for detecting intruders.

It should be noted that, using the ASD technique of the present invention provides a low probability that an effective attack will succeed against any particular host since an adversary would have to be able to know which packets in an ASD-tunneled stream (made up of packets from potentially several hosts) were destined to a particular host. Each packet destined to a particular host has identity parameters translated on a packet-by-packet basis. An adversary monitoring a network can only monitor enclave-to-enclave messages. Thus, since the ASD technique translates each machine's identity in an observably-random manner, it would be virtually impossible for the adversary to determine which sets of packets were destined to a particular host relying solely on addressing and service/port information.

The use of an internal-cache is an implementation suggestion to minimize the performance penalty. Although it may be possible to function without a cache, doing so would involve either static host-table configuration, or live "ping as you go" sensing of recipient hosts on a per-packet basis. In the static host-table case, the administrator would have to edit a configuration file in the ASD to define the addresses of valid hosts in the enclave; this would make the addition or removal of hosts incur additional operational overhead. In the live sensing case, the ASD would have to precede each received packet by a probe packet to verify that the packet's destination maps to a true enclave host. Additionally, another cache might be maintained to store invalid addresses; this would eliminate the need for the explicit ARP request and further enhance performance. The use of caching is not the only method of determining whether the received IP address is valid.

Using this technique, it is possible for ASD devices to act as intrusion detection sensors. The actions taken on receipt of packets that do not decode is not strictly limited to those presented here; it is envisioned that occurrences of untranslatable packets will be handed off to a more complex, stateful security monitoring system that can aggregate multiple occurrences together. Such an expert system would be able to distinguish an isolated faulty packet from a concerted attack.

It should be noted that while the invention has been described above in the context of TCP/IP version 4 suite of protocols, the invention is not limited as such. The same concept could be used for other protocols such as, for example, Asynchronous Transfer Mode, Token Ring, Frame Relay, IPv6, cellular digital packet data (CDPD), internet control message protocol (ICMP), internet group management protocol (IGMP) and in general, other entity address-based protocols for wireline or wireless communications. Each of these protocols contains header parameters, relating to a machine's location in the network that could be translated, thereby providing obfuscation of the network topology.

It should also be noted that while the invention has been described above in the context being implemented as a software modification to a bastion host, the invention is not limited as such. The present invention can also be implemented as software or hardware modifications to a computer, router, firewall, network address translator (NAT), Bridge, Switch, Gateway, virtual private network (VPN) device, transceiver, mobile communications device, satellite and the like. Accordingly, the teaching of this invention can be applied to any type of network communications device or system using addressing techniques to route to a network device.

While the invention has been particularly shown and described with respect to preferred embodiments thereof, it will be understood by those skilled in the art that changes in form and details may be made therein without departing from the scope and spirit of the invention.

Having described the invention, what is claimed as new and secured by Letters Patent is:

1. A system, comprising:
a bastion host configured to:
determine, based on a destination address included in packet header information of a data packet, whether a remote bastion host is configured to perform adaptive self-synchronized dynamic address translation (ASD);
generate a cipher key by the bastion host when the remote bastion host is not configured to perform ASD;
generate the cipher key according to a handshake with the remote bastion host when the remote bastion host is configured to perform ASD; and
add an entry to an active connection table including the generated cipher key and at least a subset of the packet header information of the data packet.

2. The system of claim 1, wherein the bastion host is further configured to:
encrypt predetermined portions of the packet header information into translated packet header information according to a cipher algorithm keyed by the cipher key; and
replace the predetermined portions of the packet header information with the translated packet header information in the data packet.

3. The system of claim 2, wherein the bastion host is further configured to transmit the data packet from the bastion host to the remote bastion host after replacing the predetermined portions of the packet header information with the translated packet header information.

4. The system of claim 1, wherein the bastion host is further configured to query a host table for an address of the remote bastion host, and determine based on the query whether the destination address is associated with a remote bastion host configured to perform ASD.

5. The system of claim 1, wherein the bastion host is further configured to:
generate a second cipher key according to a second handshake with the remote bastion host when the remote bastion host is configured to perform ASD; and
update the entry in the active connection table to replace the cipher key with the second cipher key.

6. The system of claim 5, wherein the bastion host is further configured to initiate the generation of the second cipher key after expiration of a timeout value.

7. The system of claim 5, wherein the bastion host is further configured to:
encrypt predetermined portions of packet header information of a second data packet according to the cipher algorithm keyed by the second cipher key into second translated packet header information; and
replace the predetermined portions of the packet header information of the second data packet with the second translated packet header information.

8. The system of claim 1, wherein the bastion host is further configured to:
receive a second data packet from the remote bastion host;
perform a lookup in the active connection table for predetermined portions of packet header information of the second data packet; and
when a matching entry is found in the active connection table, restore predetermined portions of packet header information of the second data packet using a cipher key included in the matching entry of the active connection table.

9. A method, comprising:
receiving, at a bastion host, a packet including packet header information, the packet information including a destination address;

determining, by a bastion host, whether the destination address is associated with a remote bastion host configured to perform adaptive self-synchronized dynamic address translation (ASD);

generating a cipher key by the bastion host based on a determination that the remote bastion host is not configured to perform ASD;

generating the cipher key according to a handshake with the remote bastion host based on a determination that the remote bastion host is configured to perform ASD; and adding an entry to an active connection table including the cipher key and destination address.

10. The method of claim 9, further comprising:

translating predetermined portions of the packet header information according to a cipher algorithm keyed by the cipher key into translated packet header information; and replacing the predetermined portions of the packet header information with the translated packet header information in the data packet.

11. The method of claim 10, further comprising transmitting the packet from the bastion host to the remote bastion host after replacing the predetermined portions of the packet header information.

12. The method of claim 9, further comprising:

generating a second cipher key according to a second handshake with the remote bastion host;

translating predetermined portions of packet header information of a second packet according to the cipher algorithm keyed by the second cipher key into second translated packet header information; and replacing the predetermined portions of the packet header information of the second packet with the second translated packet header information.

13. The method of claim 12, wherein generating a second cipher key according to a second handshake with the remote bastion host is performed after expiration of a handshake timeout.

14. The method of claim 9, further comprising:

receiving a second data packet from the remote bastion host;

performing a lookup in the active connection table for predetermined portions of packet header information of the second data packet; and when a matching entry is found in the active connection table, restoring predetermined portions of packet header information of the second data packet using a cipher key included in the matching entry of the active connection table.

15. The system of claim 2, wherein the bastion host is further configured to at least one of:

replace at least predetermined portions of a source address and the destination address of the packet header information in the data packet with the translated packet header information when the remote bastion host is configured to perform ASD; and replace at least predetermined portions of the source address but not the destination address of the packet header information in the data packet with the translated packet header information when the remote bastion host is not configured to perform ASD.

16. The system of claim 8, wherein the bastion host is further configured to, when the matching entry is not found in the active connection table, at least one of: (i) drop the second data packet, and (ii) return an obfuscated reply disguising that the second data packet is identified by the bastion host as not being found in the active connection table.

17. The system of claim 8, wherein the second data packet is a reply to the data packet, and the bastion host is further configured to restore the predetermined portions of the packet header information of the second data packet based on the at least a subset of the packet header information of the data packet included in the matching entry of the active connection table.

18. The method of claim 10, further comprising:

replacing at least predetermined portions of a source address and the destination address of the packet header information in the data packet with the translated packet header information when the remote bastion host is configured to perform ASD; and replacing at least predetermined portions of the source address but not the destination address of the packet header information in the data packet with the translated packet header information when the remote bastion host is not configured to perform ASD.

19. The method of claim 14, further comprising, when the matching entry is not found in the active connection table, at least one of: (i) dropping the second data packet, and (ii) returning an obfuscated reply disguising that the second data packet is identified as not being found in the active connection table.

20. The method of claim 14, wherein the second data packet is a reply to the data packet, and further comprising restoring the predetermined portions of the packet header information of the second data packet based on the at least a subset of the packet header information of the data packet included in the matching entry of the active connection table.

* * * * *